(12) United States Patent
Wang et al.

(10) Patent No.: US 10,466,362 B1
(45) Date of Patent: ***Nov. 5, 2019

(54) INTEGRATED NAVIGATION INTEGRITY MONITORING SYSTEM FOR UNMANNED AERIAL VEHICLES

(71) Applicant: Beihang University, Beijing (CN)

(72) Inventors: Zhipeng Wang, Beijing (CN); Yanbo Zhu, Beijing (CN); Wei Liu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,614

(22) Filed: Jun. 4, 2019

(30) Foreign Application Priority Data

Mar. 27, 2019 (CN) .......................... 2019 1 0236625

(51) Int. Cl.
*G01S 19/20* (2010.01)
*G08G 5/00* (2006.01)
*G01C 21/16* (2006.01)

(52) U.S. Cl.
CPC ............ *G01S 19/20* (2013.01); *G01C 21/165* (2013.01); *G08G 5/0069* (2013.01)

(58) Field of Classification Search
CPC ....... G01S 19/20; G01C 21/16; G01C 21/165; G08G 5/0069
See application file for complete search history.

(56) References Cited

U.S. PATENT DOCUMENTS

| | | | | |
|---|---|---|---|---|
| 7,219,013 B1* | 5/2007 | Young | ................... | G01C 21/165 342/357.58 |
| 2009/0326736 A1* | 12/2009 | Waid | ....................... | G01S 19/20 701/3 |
| 2012/0146851 A1* | 6/2012 | Fernandez | .............. | G01S 19/20 342/357.58 |
| 2013/0050020 A1* | 2/2013 | Peck | ....................... | G01S 19/20 342/357.27 |
| 2019/0187295 A1* | 6/2019 | Lee | .......................... | G01S 19/20 |

* cited by examiner

*Primary Examiner* — Bernarr E Gregory
*Assistant Examiner* — Fred H Mull
(74) *Attorney, Agent, or Firm* — Locke Lord LLP; Tim Tingkang Xia, Esq.

(57) ABSTRACT

The present disclosure provides an integrated navigation integrity monitoring system for unmanned aerial vehicles, comprising: an inertial measurement unit for providing a processor with zero offset values of different levels of inertial measurement units; a receiver for receiving signals from global satellite navigation and providing the processor with an integrity risk of a global satellite navigation system; and the processor for calculating a horizontal protection level of integrated navigation and a vertical protection level of integrated navigation, setting a horizontal alert limit and a vertical alert limit, comparing the horizontal protection level and the vertical protection level obtained by calculation with the corresponding horizontal alert limit and vertical alert limit respectively, and monitoring the integrity of the unmanned aerial vehicle. An inertial navigation system can be achieved without hardware redundancy, and the cost of integrated navigation integrity monitoring can be reduced.

9 Claims, 3 Drawing Sheets

Fig. 5

INTEGRATED NAVIGATION INTEGRITY MONITORING SYSTEM FOR UNMANNED AERIAL VEHICLES

CROSS-REFERENCE TO RELATED PATENT APPLICATION

This non-provisional application claims priority to and the benefit of, pursuant to 35 U.S.C. § 119(a), patent application Serial No. CN201910236625.0 filed in China on Mar. 27, 2019. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present disclosure relates to the technical field of aerial navigation, in particular to an integrated navigation integrity monitoring system for unmanned aerial vehicles.

BACKGROUND

With the increasing wide application of unmanned aerial vehicles (UAVs) in the civilian field, many conveniences are brought for people's work and life, such as agricultural plant protection unmanned aerial vehicles and unmanned aerial vehicles for aerial photography, but many security risks are also brought, such as the frequent occurrence of "black flight" incidents and flight at crowded places and airports, which have brought many troubles to the production and life of the society. How to effectively realize the safe flight of UAVs in the controlled airspace is a practical problem in the application of UAVs in the civilian field. Safety measures for achieving the flight of UAVs in a specific area achieve the safety of operations and achieve safe and effective flight in a specific airspace, on the one hand, the flight boundary of UAVs can be restricted in the area where the no-fly zone is set to achieve the flight prohibition; on the other hand, the control of UAVs can be efficiently achieved, thereby avoiding interference with the normal production and life of people, and endangering the production and life safety of people.

The integrated navigation technology of a global navigation satellite system (GNSS) and an inertial navigation system (INS) provides the UAVs with real-time, stable and accurate location information. The use of the GNSS/INS integrated navigation system not only provides horizontal navigation services, but also provides vertical navigation services. The traditional method adopts hardware redundancy to achieve the integrity of the INS system. However, in the civilian field, it is usually necessary to consider the limitation of hardware cost. Therefore, it obviously does not meet the actual application needs to adopt the hardware redundancy method to achieve the integrity of the INS system. The receiver autonomous integrity monitoring (RAIM) technology is usually adopted to achieve the integrity of the GNSS system.

Therefore, in order to overcome the limitation of adopting the hardware redundancy to achieve the integrity of the INS system in the related art, an integrated navigation integrity monitoring method for unmanned aerial vehicles (UAVs) which requires no hardware redundancy and reduces cost is needed.

SUMMARY

The object of the present disclosure is to provide an integrated navigation integrity monitoring system for unmanned aerial vehicles, comprising:

an inertial measurement unit for providing a processor with zero offset values of different levels of inertial measurement units;

a receiver for receiving signals from global satellite navigation and providing the processor with an integrity risk of a global satellite navigation system; and the processor for calculating a horizontal protection level of integrated navigation and a vertical protection level of integrated navigation, wherein the horizontal protection level of the integrated navigation is calculated by the following method:

HPL=max {$HPL_{GNSS,fault}$, $HPL_{IMU,fault}$, $HPL_{IMU,Nominal}$}, wherein $HPL_{GNSS,fault}$ is a horizontal protection level under the global satellite navigation system fault hypothesis, $HPL_{IMU,fault}$ is a horizontal protection level under the inertial navigation fault hypothesis, and $HPL_{IMU,Nominal}$ is a horizontal protection level under the inertial navigation nominal hypothesis;

the vertical protection level of the integrated navigation is calculated by the following method:

VPL=max({$VPL_{GNSS,fault}$, $VPL_{IMU,fault}$, $VPL_{IMU,Nominal}$}, wherein $VPL_{GNSS,fault}$ is a vertical protection level under the global satellite navigation system fault hypothesis, $VPL_{IMU,fault}$ is a vertical protection level under the inertial navigation fault hypothesis, and $VPL_{IMU,Nominal}$ is a vertical protection level under the inertial navigation nominal hypothesis;

the processor further executes the following instructions: setting a horizontal alert limit according to the lateral dimension of the unmanned aerial vehicle, setting a vertical alert limit according to the longitudinal dimension of the unmanned aerial vehicle, comparing the horizontal protection level of the integrated navigation obtained by calculation with the horizontal alert limit, and comparing the vertical protection level of the integrated navigation obtained by calculation with the vertical alert limit, and monitoring the unmanned aerial vehicle.

Preferably, the horizontal protection level under the inertial navigation nominal hypothesis $HPL_{IMU,Nominal}$ is calculated by the following method:

$$HPL_{IMU,Nominal}=K_{md,INS,H}\sigma_{IMU,std,h},$$

wherein $\sigma_{IMU,std,h}$ is a standard deviation of performance parameters of the inertial measurement unit in the horizontal direction, and $K_{md,INS,H}$ is a missed detection coefficient in the horizontal direction under the inertial navigation nominal hypothesis;

the missed detection coefficient in the horizontal direction under the inertial navigation nominal hypothesis $K_{md,INS,H}$ is obtained by the following method:

$$K_{md,INS,H}=Q^{-1}(\lambda_{IMU,std,h}P_{HMI,H,Nominal}),$$

wherein, Q is a cumulative distribution function of zero-mean Gaussian distribution, $\lambda_{IMU,std,h}$ is an error weight ratio of an integrity risk in the horizontal direction under the inertial navigation nominal hypothesis, and satisfies 0<

$\lambda_{IMU,std,h}<1$, and $P_{HMI,H,Nominal}$ is the integrity risk allocated in the horizontal direction under the inertial navigation nominal hypothesis;

the standard deviation of the performance parameters of the inertial measurement unit in the horizontal direction $\sigma_{IMU,std,h}$ is obtained by the following method:

$$\sigma_{IMU,std,h} = \sqrt{(\sigma_{IMU,std,N})^2 + (\sigma_{IMU,std,E})^2},$$

wherein $\sigma_{IMU,std,N}$ is a northward standard deviation under the north east up coordinate system, and $\sigma_{IMU,std,E}$ is an eastward standard deviation under the north east up coordinate system.

Preferably, the horizontal protection level under the inertial navigation fault hypothesis $HPL_{IMU,fault}$ is calculated by the following method:

$$HPL_{IMU,fault} = K_{md,INS-fault,H}\sigma_{IMU,fault,h} + \frac{1}{N}\sum_{i=1}^{N}(K_{k,i} + \Gamma_{\omega,i}\vec{\omega}_{k,i}),$$

wherein $\sigma_{IMU,fault,h}$ is a fault deviation in the horizontal direction under the inertial navigation fault hypothesis, $K_{md,INS-fault,H}$ is a missed detection coefficient in the horizontal detection under the inertial navigation fault hypothesis, $K_{k,i}$ is Kalman filter gain at the current sampling instant i, $\Gamma_{\omega,i}\vec{\omega}_{k,i}$ is a process noise deviation correction quantity at the current sampling instant i, $\Gamma_{\omega,i}$ is a noise covariance matrix input at the current instant i, $\vec{\omega}_{k,i}$ is a process noise vector at the current time i, and k is the state of an extended Kalman filter equation in the integrated navigation, N=1, 2, . . . ;

the missed detection coefficient in the horizontal direction under the inertial navigation fault hypothesis $K_{md,INS-fault,H}$ is obtained by the following method:

$$K_{md,INS-fault,H}=Q^{-1}(\lambda_{IMU,fault,h}P_{HMI,H,INS}),$$

wherein Q is a cumulative distribution function of zero-mean Gaussian distribution, $\lambda_{IMU,fault,h}$ is an error weight ratio of an integrity risk in the horizontal direction under the inertial navigation fault hypothesis, and satisfies $0<\lambda_{IMU,fault,h}<1$, and $P_{HMI,H,INS}$ is the integrity risk allocated in the horizontal direction under the inertial navigation fault hypothesis;

the fault deviation in the horizontal direction under the inertial navigation fault hypothesis $\sigma_{IMU,fault,h}$ is obtained by the following method:

$$\sigma_{IMU,fault,h} = \sqrt{(\sigma_{IMU,fault,N})^2 + (\sigma_{IMU,fault,E})^2},$$

wherein $\sigma_{IMU,fault,N}$ is a northward fault deviation under the north east up coordinate system, and $\sigma_{IMU,fault,E}$ is an eastward fault deviation under the north east up coordinate system.

Preferably, the horizontal protection level under the global satellite navigation system fault hypothesis $HPL_{GNSS,fault}$ is calculated by the following method:

$$HPL_{GNSS,fault}=\mu_{max,h}+K_{ffmd,H}\sigma_{x_k,h},$$

wherein $$\mu_{max,h} = \frac{1}{N}\sum_{i=1}^{N}\mu_{k,h,i}$$

is an arithmetic mean correction quantity of a component $\mu_{k,h,i}$ of an mean position deviation $\alpha_{k,i}$ in the horizontal direction, $K_{ffmd,H}$ is a missed detection coefficient in the horizontal detection under the global navigation system fault hypothesis, and $\sigma_{x_k,h}$ is a fault deviation in the horizontal detection under the global navigation system fault hypothesis, the missed detection coefficient in the horizontal detection under the global navigation system fault hypothesis $K_{ffmd,H}$ is obtained by the following method:

$$K_{ffmd,H}=Q^{-1}(P_{HMI,H,GNSS}/2),$$

wherein Q is a cumulative distribution function of zero-mean Gaussian distribution, and $P_{HMI,H,GNSS}$ is an integrity risk allocated in the horizontal direction under the global navigation system fault hypothesis.

Preferably, the vertical protection level under the inertial navigation nominal hypothesis $VPL_{IMU,Nominal}$ is calculated by the following method:

$$VPL_{IMU,Nominal}=K_{md,INS,V}\sigma_{IMU,std,v},$$

wherein $\sigma_{IMU,std,v}$ is a standard deviation of performance parameters of the inertial measurement unit in the vertical direction, and $K_{md,INS,V}$ is a missed detection coefficient in the vertical detection under the inertial navigation nominal hypothesis;

the missed detection coefficient in the vertical detection under the inertial navigation nominal hypothesis $K_{md,INS,V}$ is obtained by the following method:

$$K_{md,INS,V}=Q^{-1}(1-\lambda_{IMU,std,v}P_{HMI,V,Nominal})$$

wherein Q is a cumulative distribution function of zero-mean Gaussian distribution, $\lambda_{IMU,std,v}$ is an error weight ratio of an integrity risk in the vertical direction under the inertial navigation nominal hypothesis, and satisfies $0<\lambda_{IMU,std,v}<1$, and $P_{HMI,V,Nominal}$ is the integrity risk allocated in the vertical direction under the inertial navigation nominal hypothesis;

the standard deviation of the performance parameters of the inertial measurement unit in the vertical direction $\sigma_{IMU,std,v}$ is obtained by the following method:

$$\sigma_{IMU,std,v}=\sigma_{IMU,std,U},$$

wherein $\sigma_{IMU,std,v}$ is an upward standard deviation under the north east up coordinate system.

Preferably, the vertical protection level under the inertial navigation fault hypothesis $VPL_{IMU,fault}$ is calculated by the following method:

$$VPL_{IMU,fault} = K_{md,INS-fault,V}\sigma_{IMU,fault,v} + \frac{1}{N}\sum_{1}^{N}(K_{k,i} + \Gamma_{\omega,i}\vec{\omega}_{k,i}),$$

wherein $\sigma_{IMU,fault,v}$ is a fault deviation in the vertical direction under the inertial navigation fault hypothesis, $K_{md,INS-fault,V}$ is a missed detection coefficient in the vertical detection under the inertial navigation fault hypothesis, $K_{k,i}$ is Kalman filter gain at the current sampling instant i, $\Gamma_{\omega,i}\vec{\omega}_{k,i}$ is a process noise deviation correction quantity at the current sampling instant i, $\Gamma_{\omega,i}$ is a noise covariance matrix input at the current instant i, $\vec{\omega}_{k,i}$ is a process noise vector at the current instant i, and k is the state of an extended Kalman filter equation in the integrated navigation, N=1, 2, . . . ;

the missed detection coefficient in the vertical detection under the inertial navigation fault hypothesis $K_{md,INS-fault,V}$ is obtained by the following method:

$$K_{md,INS-fault,V}=Q^{-1}(1-\lambda_{IMU,fault,v}P_{HMI,V,INS})$$

wherein Q is a cumulative distribution function of zero-mean Gaussian distribution, $\lambda_{IMU,fault,v}$ is an error weight ratio of an integrity risk in the vertical direction under the inertial navigation fault hypothesis, and satisfies $0 < \lambda_{IMU,fault,v} < 1$, and $P_{HMI,V,INS}$ is the integrity risk allocated in the vertical direction under the inertial navigation fault hypothesis;

the fault deviation in the vertical direction under the inertial navigation fault hypothesis $\sigma_{IMU,fault,v}$ is obtained by the following method:

$$\sigma_{IMU,fault,v} = \sigma_{IMU,fault,U},$$

wherein $\sigma_{IMU,fault,U}$ is an upward fault deviation under the north east up coordinate system.

Preferably, the vertical protection level under the global satellite navigation system fault hypothesis $VPL_{GNSS,fault}$ is calculated by the following method:

$$VPL_{GNSS,fault} = \mu_{max,v} + K_{ffmd,V}\sigma_{x_k,v},$$

wherein $$\mu_{max,v} = \frac{1}{N}\sum_{i=1}^{N}\mu_{k,v,i}$$

is an arithmetic mean correction quantity of a component $\mu_{k,v,i}$ of a mean position deviation $\mu_{k,i}$ in the vertical direction, $K_{ffmd,V}$ is a missed detection coefficient in the vertical detection under the global navigation system fault hypothesis, and $\sigma_{x_k,v}$ is a fault deviation in the vertical direction under the global navigation system fault hypothesis.

the missed detection coefficient in the horizontal detection under the global navigation system fault hypothesis $K_{ffmd,V}$ is obtained by the following method:

$$K_{ffmd,V} = Q^{-1}(1 - P_{HMI,V,GNSS}/2),$$

wherein Q is a cumulative distribution function of zero-mean Gaussian distribution, and $P_{HMI,V,GNSS}$ is an integrity risk allocated in the vertical direction under the global navigation system fault hypothesis.

Preferably, the dimension 1.1 to 1.3 times larger than the lateral dimension of the unmanned aerial vehicle is set as a first horizontal alert limit, and the dimension 1.1 to 1.3 times larger than the longitudinal dimension of the unmanned aerial vehicle is set as a first vertical alert limit, so that a space cube enclosed by the first horizontal alert limit and the first vertical alert limit is shrunken onto a flight path of the unmanned aerial vehicle, the horizontal protection level of the integrated navigation obtained by calculation is compared with the first horizontal alert limit, and the vertical protection level of the integrated navigation is compared with the first vertical alert limit, when the horizontal protection level is higher than the first horizontal alert limit and/or the vertical protection level is higher than the first vertical alert limit, the horizontal protection level of the integrated navigation and the vertical protection level of the integrated navigation are recalculated, so that the horizontal protection level is lower than the first horizontal alert limit, and the vertical protection level is lower than the first vertical alert limit.

Preferably, the dimension 100 to 1000 times larger than the lateral dimension of the unmanned aerial vehicle is set as a second horizontal alert limit, and the dimension 100 to 1000 times larger than the longitudinal dimension of the unmanned aerial vehicle is set as a second vertical alert limit, so that a space cube enclosed by the second horizontal alert limit and the second vertical alert limit forms a flight space of the unmanned aerial vehicle, the horizontal protection level of the integrated navigation obtained by calculation is compared with the second horizontal alert limit, and the vertical protection level of the integrated navigation is compared with the second vertical alert limit, when the horizontal protection level is higher than the second horizontal alert limit and/or the vertical protection level is higher than the second vertical alert limit, the horizontal protection level of the integrated navigation and the vertical protection level of the integrated navigation are recalculated, so that the horizontal protection level is lower than the second horizontal alert limit, and the vertical protection level is lower than the second vertical alert limit.

According to the integrated navigation integrity monitoring system for the unmanned aerial vehicles provided by the present disclosure, the integrity risk is allocated to the horizontal and vertical directions, then the integrity risks in the horizontal and vertical directions are divided into a nominal hypothesis, an inertial navigation fault hypothesis and a global navigation fault hypothesis, and the horizontal protection and vertical protection levels are calculated respectively, so that an inertial navigation system can be achieved without hardware redundancy, and the cost of integrated navigation integrity monitoring can be reduced.

According to the integrated navigation integrity monitoring system for the unmanned aerial vehicles provided by the present disclosure, the hardware redundancy of the inertial navigation system (INS) is not needed any more, thereby greatly reducing the cost of unmanned aerial vehicle navigation on the one hand, and avoiding interference of redundant information on the other hand.

According to the integrated navigation integrity monitoring system for the unmanned aerial vehicles provided by the present disclosure, the risk is allocated to a horizontal domain and a vertical domain through the allocation of integrity risk, and then the fault hypothesis in the horizontal domain and the vertical domain are divided into three parts: a nominal hypothesis, a global navigation system fault hypothesis and an inertial navigation fault hypothesis, thereby achieving the integrity of the system from the system level and also achieving the integrity of each branch from the hardware level.

According to the integrated navigation integrity monitoring system for the unmanned aerial vehicles provided by the present disclosure, the planning and tracking of the UAV navigation path can be realized only by limiting the horizontal alert limit and the vertical alert limit according to the requirements of actual application. And according to the determined specific flight airspace boundary, the corresponding horizontal alert limit and vertical alert limit can be set, so that the safe flight of the unmanned aerial vehicle in the controlled airspace can be realized, and the practical application such as corresponding airspace flight prohibition can be derived.

It should be understood that the foregoing general description and the subsequent detailed description are illustrative descriptions and explanations and should not be used as a limitation of the claimed protection content of the present disclosure.

BRIEF DESCRIPTION OF THE DRAWINGS

Further objects, functions, and advantages of the present disclosure will be clarified by the following description of the embodiments of the present disclosure with reference to the accompanying drawings.

DETAILED DESCRIPTION

Objects and functions and methods for achieving the objects and functions of the present disclosure will be clarified by referring to exemplary embodiments. However, the present disclosure is not limited to the exemplary embodiments disclosed below; it can be implemented in various forms. The essence of the description is merely to assist those skilled in the related art in comprehensive understanding of the details of the present disclosure.

Hereinafter, the embodiments of the present disclosure will be described with reference to the accompanying drawings. In the accompanying drawings, the same accompanying drawing reference numbers are used to represent the same or similar components, or the same or similar steps.

In order to solve the problem that the integrated navigation of unmanned aerial vehicles (UAVs) needs to rely on hardware redundancy to realize the limitation of the integrity of an inertial navigation system, resulting in high cost of integrated navigation in the relate art, the present disclosure provides an integrated navigation integrity monitoring system for unmanned aerial vehicles which requires no hardware redundancy and reduces the cost of unmanned aerial vehicle navigation.

The present disclosure simultaneously considers the requirements of a horizontal protection level (HPL) and a vertical protection level (VPL) of unmanned aerial vehicle navigation information in an airspace where the unmanned aerial vehicle is located. Due to the integrity of an navigation system of the unmanned aerial vehicle, it is necessary to detect the navigation fault in real time, provide a user with integrity risk information, and respond accordingly in time when the fault occurs. In the present disclosure, the integrity risk of a user is allocated to two directions: horizontal and vertical directions, then the integrity risks $P_{HMI}$ in the horizontal and vertical directions are divided into three cases: a nominal hypothesis fault, an inertial navigation (INS) fault and a global navigation system (GNSS) fault, the horizontal protection level (HPL) and the vertical protection level (VPL) under each fault hypothesis are calculated respectively, and the maximum values of the corresponding horizontal protection level (HPL) and vertical protection level (VPL) are taken in the same direction at the same instant as the horizontal protection level (HPL) and the vertical protection level (VPL) at the sampling instant, thereby eliminating the reliance on hardware redundancy.

Figure 1:
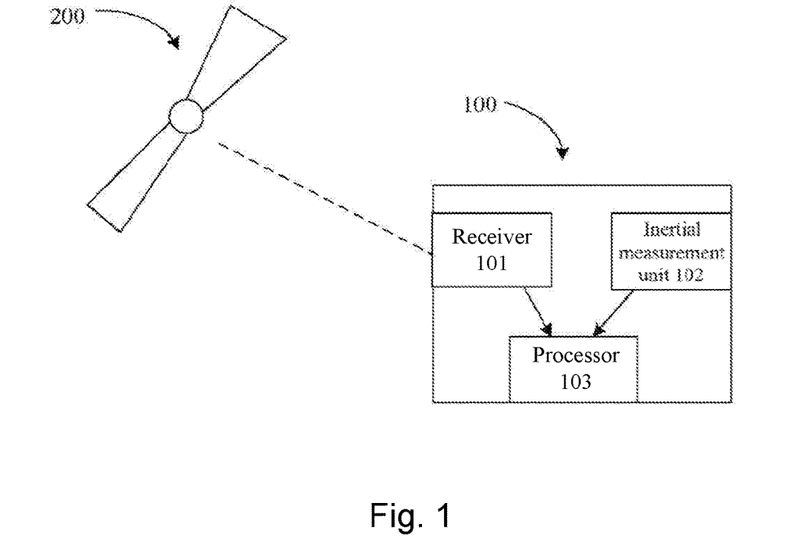
FIG. 1 schematically illustrates a schematic structural diagram of an integrated navigation integrity monitoring system for unmanned aerial vehicles according to the present disclosure.

As shown in FIG. 1 illustrating a schematic structural diagram of the integrated navigation integrity monitoring system for unmanned aerial vehicles according to the present disclosure, the integrated navigation integrity monitoring system for unmanned aerial vehicles according to the embodiment of the present disclosure comprises:

an inertial measurement unit 102 for providing a processor 103 with zero offset values of different levels of inertial measurement units;

a receiver 101 for receiving signals from global satellite navigation 200 and providing the processor 103 with an integrity risk of a global satellite navigation system. The integrity risk of the global satellite navigation system is achieved using a receiver autonomous integrity monitoring (RAIM) technology; and the processor 103 for calculating a horizontal protection level of integrated navigation and a vertical protection level of integrated navigation. The process of calculating the horizontal protection level of the integrated navigation and the vertical protection level of the integrated navigation by the processor 103 is described in detail below.

Figure 2:
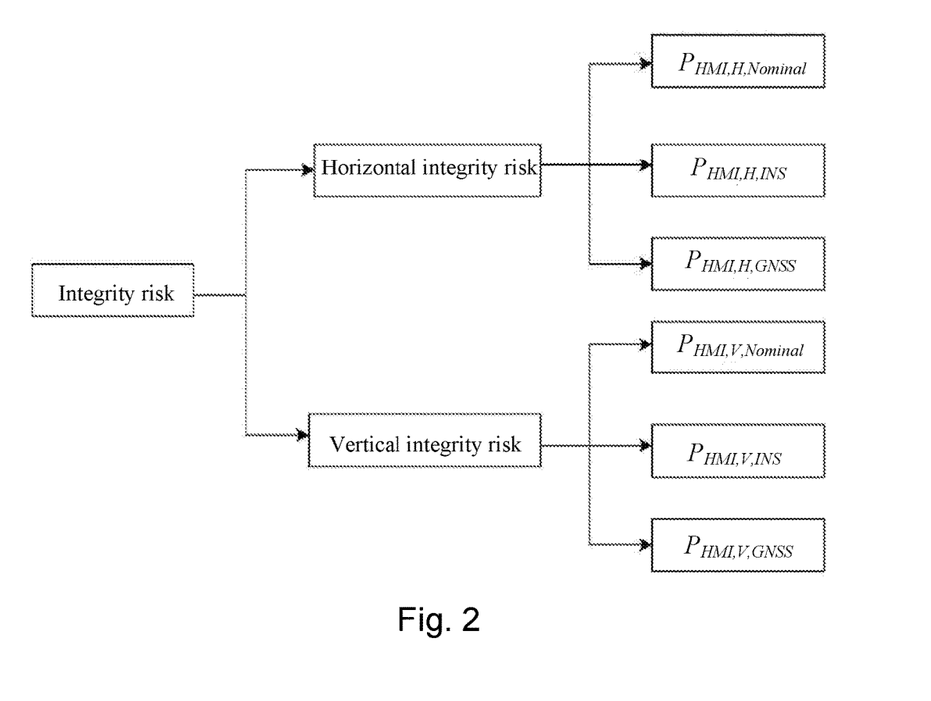
FIG. 2 illustrates a schematic diagram of integrity risk classification according to the present disclosure.

In order to make the present disclosure more clear, before the calculation of the horizontal protection level of the integrated navigation and the vertical protection level of the integrated navigation, the integrity risk classification of the present disclosure is given in the embodiment, as shown in FIG. 2 illustrating a schematic diagram of the integrity risk classification according to the present disclosure, the integrity risk $P_{HMI,Total}$ is divided into a horizontal integrity risk $P_{HMI,Horizontal}$ and a vertical integrity risk $P_{HMI,Vertical}$ and the horizontal integrity risk and the vertical integrity risk are classified according to a nominal hypothesis, an inertial navigation fault hypothesis and a global navigation system fault hypothesis, namely, an integrity risk allocated in the horizontal direction under the inertial navigation nominal hypothesis $P_{HMI,H,Nominal}$, an integrity risk allocated in the horizontal direction under the inertial navigation fault hypothesis $P_{HMI,H,INS}$, an integrity risk allocated in the horizontal direction under the global navigation system fault hypothesis $P_{HMI,H,GNSS}$, an integrity risk allocated in the vertical direction under the inertial navigation nominal hypothesis $P_{HMI,V,Nominal}$, an integrity risk allocated in the vertical direction under the inertial navigation fault hypothesis $P_{HMI,V,INS}$, and an integrity risk allocated in the vertical direction under the global navigation system fault hypothesis $P_{HMI,V,GNSS}$.

Figure 3:
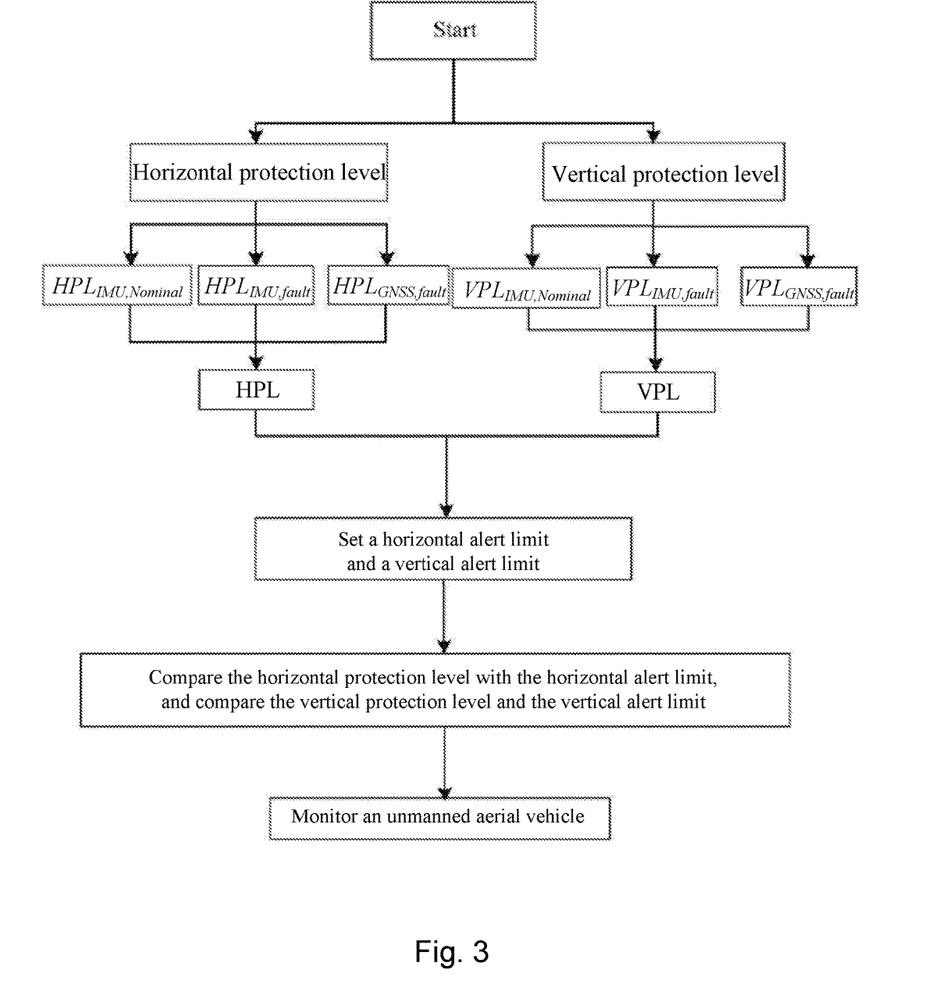
FIG. 3 illustrates a schematic flow diagram of processing and calculation of a horizontal protection level and a vertical protection level by using a processor according to the present disclosure.

Through the above-mentioned integrity risk classification, the horizontal protection level of the integrated navigation and the vertical protection level of the integrated navigation are calculated, as shown in FIG. 3 illustrating a schematic flow diagram of processing and calculation of the horizontal protection level and the vertical protection level by using the processor according to the present disclosure.

Calculation of the Horizontal Protection Level of Integrated Navigation

The horizontal protection level (HPL) of integrated navigation is calculated by the following steps:

$HPL = \max\{HPL_{GNSS,fault}, HPL_{IMU,fault}, HPL_{IMU,Nominal}\}$, wherein $HPL_{GNSS,fault}$ is a horizontal protection level under the global satellite navigation system fault hypothesis, $HPL_{IMU,fault}$ is a horizontal protection level under the inertial navigation fault hypothesis, and $HPL_{IMU,Nominal}$ is a horizontal protection level under the inertial navigation nominal hypothesis, According to the embodiment of the present disclosure, the horizontal protection level under the inertial navigation nominal hypothesis $HPL_{IMU,Nominal}$ is calculated by the following method:

$$HPL_{IMU,Nominal} = K_{md,INS,H} \sigma_{IMU,std,h},$$

wherein $\sigma_{IMU,std,h}$ is a standard deviation of performance parameters of the inertial measurement unit in the horizontal direction, and $K_{md,INS,H}$ is a missed detection coefficient in the horizontal direction under the inertial navigation nominal hypothesis.

In the case of no-fault nominal hypothesis, the standard deviation of the performance parameters of the inertial measurement unit in the horizontal direction $\sigma_{INS,std,h}$ is determined by northward and eastward deviations of the inertial measurement unit, namely, determined by the deviations of the inertial measurement unit on two axes of north and east directions under the north east up coordinate system.

According to the embodiment of the present disclosure, the standard deviation of the performance parameters of the inertial measurement unit in the horizontal direction $\sigma_{IMU,std,h}$ is obtained by the following method:

$$\sigma_{IMU,std,h} = \sqrt{(\sigma_{IMU,std,N})^2 + (\sigma_{IMU,std,E})^2},$$

wherein $\sigma_{IMU,std,N}$ is a northward standard deviation under the north east up coordinate system, and $\sigma_{IMU,std,E}$ is an eastward standard deviation under the north east up coordinate system.

The northward standard deviation under the north east up coordinate system $\sigma_{IMU,std,N}$ and the eastward standard deviation under the north east up coordinate system $\sigma_{IMU,std,E}$ are provided according to the zero offset values of different levels of inertial measurement units, as shown in Table 1 showing zero offset values of different levels of inertial measurement units. According to the actual situation of the deviations of the inertial measurement units themselves, the northward standard deviation and the eastward standard deviation are used to jointly describe the standard deviation in the horizontal direction, and the integrity in the horizontal direction is achieved from the original parameters of inertial navigation in the present disclosure.

TABLE 1

Zero offset values of different levels of inertial measurement units

| Levels of inertial measurement units (IMUs) | Accelerometer zero offset (m/s$^{-2}$) | Gyro zero offset (rad/s$^{-1}$) |
| --- | --- | --- |
| Aviation level | 3 × 10$^{-4}$ ~ 10$^{-3}$ | 5 × 10$^{-8}$ |
| Tactical level | 0.01 ~ 0.1 | 5 × 10$^{-6}$ ~ 5 ×10$^{-4}$ |
| Consumer level | Greater than 0.03 | Greater than 5 × 10$^{-4}$ |

The missed detection coefficient in the horizontal direction under the inertial navigation nominal hypothesis $K_{md,INS,H}$ is obtained by the following method:

$$K_{md,INS,H} = Q^{-1}(\lambda_{IMU,std,h} P_{HMI,H,Nominal}),$$

wherein Q is a cumulative distribution function of zero-mean Gaussian distribution, $\lambda_{IMU,std,h}$ is an error weight ratio of an integrity risk in the horizontal direction under the inertial navigation nominal hypothesis, and satisfies $0 < \lambda_{IMU,std,h} < 1$; the higher the accuracy of the inertial measurement unit is, and the closer to 0 the error weight ratio of the integrity risk in the horizontal direction under the inertial navigation nominal hypothesis is, otherwise, the lower the accuracy of the inertial measurement unit is, and the closer to 1 the error weight ratio of the integrity risk in the horizontal direction under the inertial navigation nominal hypothesis is.

According to the zero offset values of the different levels of inertial measurement units in Table 1, in some embodiments, when aviation-level, tactical-level and consumer-level inertial measurement units are used respectively, the error weight ratios of the integrity risks in the horizontal directions under the inertial navigation nominal hypotheses are taken as 1/12, 5/12, and 9/12 respectively.

$P_{HMI,H,Nominal}$ is an integrity risk allocated in the horizontal direction under the inertial navigation nominal hypothesis.

Under the inertial navigation fault hypothesis, an extended Kalman filter state equation (EKF) of integrated navigation is established as follows:

$$\bar{x}_k = \Phi_k \hat{x}_{k-1} + \Gamma_k \vec{u}_k + \Gamma_\omega \vec{\omega}_k,$$

$$\hat{x}_k = \bar{x}_k + K_k(\vec{z} - H_k \bar{x}_k),$$

in the extended Kalman filter state equation, measurement information $\vec{z}_k$ is obtained from the pseudo-range observed quantity of the global navigation system, $\vec{u}_k$ is an output vector of the inertial measurement unit, $\bar{x}_k$ is a state prediction vector, $\hat{x}_{k-1}$ is an update state vector, $\Gamma_k$ and $\Gamma_\omega$ are an input covariance matrix and a noise covariance matrix respectively, $\vec{\omega}_k$ is a process noise vector, $\Phi_k$ is a state transfer matrix, $K_k$ is Kalman filter gain and $H_k$ is a system transfer matrix.

According to the embodiment of the present disclosure, in the case of introducing the fault hypothesis into the inertial measurement unit, the horizontal protection level under the inertial navigation fault hypothesis $HPL_{IMU,fault}$ is calculated by introducing the arithmetic mean of a filter gain term and a process noise deviation correction quantity from the extended Kalman filter state equation.

Optionally, the horizontal protection level under the inertial navigation fault hypothesis $HPL_{IMU,fault}$ is calculated by the following method:

$$HPL_{IMU,fault} = K_{md,INS-fault,H}\sigma_{IMU,fault,h} + \frac{1}{N}\sum_{i=1}^{N}(K_{k,i} + \Gamma_{\omega,i}\vec{\omega}_{k,i}),$$

wherein $\sigma_{IMU,fault,h}$ is a fault deviation in the horizontal direction under the inertial navigation fault hypothesis, $K_{md,INS-fault,H}$ is a missed detection coefficient in the horizontal detection under the inertial navigation fault hypothesis, $K_{k,i}$ is Kalman filter gain at the current sampling instant i, $\Gamma_{\omega,i}\vec{\omega}_{k,i}$ is a process noise deviation correction quantity at the current sampling instant i, $\Gamma_{\omega,i}$ is a noise covariance matrix input at the current instant i, $\vec{\omega}_{k,i}$ is a process noise vector at the current time i, and k is the state of the extended Kalman filter equation in the integrated navigation, N=1, 2, . . . .

The missed detection coefficient in the horizontal direction under the inertial navigation fault hypothesis $K_{md,INS-fault,H}$ is obtained by the following method:

$$K_{md,INS-fault,H} = Q^{-1}(\lambda_{IMU,fault,h} P_{HMI,H,INS}),$$

wherein Q is a cumulative distribution function of zero-mean Gaussian distribution, $\lambda_{IMU,fault,h}$ is an error weight ratio of an integrity risk in the horizontal direction under the inertial navigation fault hypothesis, and satisfies $0 < \lambda_{IMU,fault,h} < 1$, and $P_{HMI,H,INS}$ is an integrity risk allocated in the horizontal direction under the inertial navigation fault hypothesis.

In the case of introducing the fault hypothesis into the inertial measurement unit, the fault deviation in the horizontal direction under the inertial navigation fault hypothesis $\sigma_{IMU,fault,h}$ is determined by northward and eastward fault deviations of the inertial measurement unit, namely, determined by the fault deviations of the inertial measurement unit on the two axes of north direction and east direction under the north east up coordinate system.

The fault deviation in the horizontal direction under the inertial navigation fault hypothesis $\sigma_{IMU,fault,h}$ is obtained by the following method:

$$\sigma_{IMU,fault,h} = \sqrt{(\sigma_{IMU,fault,N})^2 + (\sigma_{IMU,fault,E})^2},$$

wherein $\sigma_{IMU,fault,N}$ is a northward fault deviation under the north east up coordinate system, and $\sigma_{IMU,fault,E}$ is an eastward fault deviation under the north east up coordinate system. The northward fault deviation under the north east up coordinate system a $\sigma_{IMU,fault,N}$ and the eastward fault deviation under the north east up coordinate system $\sigma_{IMU,fault,E}$ are determined by standard deviation components of a residual $\gamma = \vec{z}_k - H_k \bar{x}_k$ in the extended Kalman filter state equation in the north direction and the east direction.

According to the embodiment of the present disclosure, the horizontal protection level under the global satellite navigation system fault hypothesis $HPL_{GNSS,fault}$ is calculated by the following method:

$$HPL_{GNSS,fault} = \mu_{max,h} + K_{ffmd,H} \sigma_{x_k,h},$$

wherein $$\mu_{max,h} = \frac{1}{N} \sum_{i=1}^{N} \mu_{k,h,i}$$

is an arithmetic mean correction quantity of a component $\mu_{k,h,i}$ of a mean position deviation $\mu_{k,i}$ in the horizontal direction, $K_{ffmd,H}$ is a missed detection coefficient in the horizontal detection under the global navigation system fault hypothesis, and $\sigma_{x_k,h}$ is a fault deviation in the horizontal detection under the global navigation system fault hypothesis.

In the above process, the arithmetic mean correction quantity of the component $\mu_{k,h,i}$ of the mean position deviation $\mu_{k,i}$ in the horizontal direction is obtained by a receiver autonomous integrity monitoring (RAIM) method. The fault deviation in the horizontal direction under the global navigation system fault hypothesis $\sigma_{x_k,h}$ is obtained by the extended Kalman filter state equation (EKF).

The missed detection coefficient in the horizontal detection under the global navigation system fault hypothesis $K_{ffmd,H}$ is obtained by the following method:

$$K_{ffmd,H} = Q^{-1}(P_{HMI,H,GNSS}/2),$$

wherein Q is a cumulative distribution function of zero-mean Gaussian distribution, and $P_{HMI,H,GNSS}$ is an integrity risk allocated in the horizontal direction under the global navigation system fault hypothesis.

Calculation of the Vertical Protection Level of Integrated Navigation

The vertical protection level (VPL) of integrated navigation is calculated by the following method:

VPL=max $\{VPL_{GNSS,fault}, VPL_{IMU,fault}, VPL_{IMU,Nominal}\}$, wherein $VPL_{GNSS,fault}$ is a vertical protection level under the global satellite navigation system fault hypothesis, $VPL_{IMU,fault}$ is a vertical protection level under the inertial navigation fault hypothesis, and $VPL_{IMU,Nominal}$ is a vertical protection level under the inertial navigation nominal hypothesis;

According to the embodiment of the present disclosure, the vertical protection level under the inertial navigation nominal hypothesis $VPL_{IMU,Nominal}$ is calculated by the following method:

$$VPL_{IMU,Nominal} = K_{md,INS,V} \sigma_{IMU,std,v},$$

wherein $\sigma_{IMU,std,v}$ is a standard deviation of performance parameters of the inertial measurement unit in the vertical direction, and $K_{md,INS,V}$ is a missed detection coefficient in the vertical direction under the inertial navigation nominal hypothesis.

The missed detection coefficient in the vertical direction under the inertial navigation nominal hypothesis $K_{md,INS,V}$ is obtained by the following method:

$$K_{md,INS,V} = Q^{-1}(1 - \lambda_{IMU,std,v} P_{HMI,V,Nominal}),$$

wherein Q is a cumulative distribution function of zero-mean Gaussian distribution, $\lambda_{IMU,std,v}$ is an error weight ratio of an integrity risk in the vertical direction under the inertial navigation nominal hypothesis, and satisfies $0 < \lambda_{IMU,std,v} < 1$, and $P_{HMI,V,Nominal}$ is the integrity risk allocated in the vertical direction under the inertial navigation nominal hypothesis.

The standard deviation of the performance parameters of the inertial measurement unit in the vertical direction only considers an upward standard deviation. Optionally, the standard deviation of the performance parameters of the inertial measurement unit in the vertical direction $\sigma_{IMU,std,v}$ is obtained by the following method:

$$\sigma_{IMU,std,v} = \sigma_{IMU,std,U},$$

wherein $\sigma_{IMU,std,v}$ is an upward standard deviation under the north east coordinate system. The upward standard deviation under the north east up coordinate system is provided by the zero offset values of the different levels of inertial measurement units in Table 1.

According to the actual situation of the deviation of the inertial measurement device itself, the present disclosure only describes the standard deviation in the vertical direction by the upward standard deviation, and achieves the integrity in the horizontal direction from the original parameters of the inertial navigation.

According to the embodiment of the present disclosure, in the case of introducing the fault hypothesis into the inertial measurement unit, the vertical protection level under the inertial navigation fault hypothesis $HPL_{IMU,fault}$ is calculated by introducing the arithmetic mean of a filter gain term and a process noise deviation correction quantity from the extended Kalman filter state equation.

The vertical protection level under the inertial navigation fault hypothesis $VPL_{IMU,fault}$ is calculated by the following method:

$$VPL_{IMU,fault} = K_{md,INS-fault,V} \sigma_{IMU,fault,v} + \frac{1}{N} \sum_{1}^{N} (K_{k,i} + \Gamma_{\omega,i} \vec{\omega}_{k,i})$$

wherein $\sigma_{IMU,fault,v}$ is a fault deviation in the vertical direction under the inertial navigation fault hypothesis, $K_{md,INS-fault,V}$ is a missed detection coefficient in the vertical detection under the inertial navigation fault hypothesis, $K_{k,i}$ is Kalman filter gain at the current sampling instant i, $\Gamma_{\omega,i}$ $\vec{\omega}_{k,i}$ is a process noise deviation correction quantity at the current sampling instant i, $\Gamma_{\omega,i}$ is a noise covariance matrix input at the current instant i, $\vec{\omega}_{k,i}$ is a process noise vector at the current time i, and k is the state of the extended Kalman filter equation in the integrated navigation, N=1, 2 . . . .

The missed detection coefficient in the vertical direction under the inertial navigation fault hypothesis $K_{md,INS\text{-}fault,V}$ is obtained by the following method:

$$K_{md,INS\text{-}fault,V} = Q^{-1}(1 - \lambda_{IMU,fault,v} P_{HMI,V,INS})$$

wherein Q is a cumulative distribution function of zero-mean Gaussian distribution, $\lambda_{IMU,fault,v}$ is an error weight ratio of an integrity risk in the vertical direction under the inertial navigation fault hypothesis, and satisfies $0 < \lambda_{IMU,fault,v} < 1$, and $P_{HMI,V,INS}$ is the integrity risk allocated in the vertical direction under the inertial navigation fault hypothesis.

In the case of introducing the fault hypothesis into the inertial measurement unit, the fault deviation in the vertical direction under the inertial navigation fault hypothesis $\sigma_{IMU,fault,v}$ is determined by the upward fault deviation of the inertial measurement unit, namely, determined by the fault deviations of the inertial measurement unit on the two axes of north direction and east direction under the north east up coordinate system.

According to the embodiment of the present disclosure, the fault deviation in the vertical direction under the inertial navigation fault hypothesis $\sigma_{IMU,fault,v}$ is obtained by the following method:

$$\sigma_{IMU,fault,v} = \sigma_{IMU,fault,U},$$

wherein $\sigma_{IMU,fault,U}$ is an upward fault deviation under the north east up coordinate system. The upward fault deviation under the north east up coordinate system $\sigma_{IMU,fault,U}$ is determined by the standard deviation component of a residual $\gamma = \vec{Z}_k - H_k \bar{x}_k$ in the extended Kalman filter state equation in the upward direction.

According to the embodiment of the present disclosure, the vertical protection level under the global satellite navigation system fault hypothesis $VPL_{GNSS,fault}$ is calculated by the following method:

$$VPL_{GNSS,fault} = \mu_{max,v} + K_{ffmd,V} \sigma_{x_k,v},$$

wherein $$\mu_{max,v} = \frac{1}{N} \sum_{i=1}^{N} \mu_{k,v,i}$$

is an arithmetic mean correction quantity of a component $\mu_{k,v,i}$ of a mean position deviation $\mu_{k,i}$ in the vertical direction, $K_{ffmd,V}$ is a missed detection coefficient in the vertical detection under the global navigation system fault hypothesis, and $\sigma_{x_k,v}$ is a fault deviation in the vertical detection under the global navigation system fault hypothesis.

In the above process, the arithmetic mean correction quantity of the component $\mu_{k,v,i}$ of the mean position deviation $\mu_{k,i}$ in the vertical direction is obtained by a receiver autonomous integrity monitoring (RAIM) method. The fault deviation in the vertical direction under the global navigation system fault hypothesis $\sigma_{x_k,v}$ is obtained by the extended Kalman filter state equation (EKF).

The missed detection coefficient in the vertical detection under the global navigation system fault hypothesis $K_{ffmd,V}$ is obtained by the following method:

$$K_{ffmd,V} = Q^{-1}(1 - P_{HMI,V,GNSS}/2),$$

wherein Q is a cumulative distribution function of zero-mean Gaussian distribution, and $P_{HMI,V,GNSS}$ is an integrity risk allocated in the vertical direction under the global navigation system fault hypothesis.

Through the above calculation, the horizontal protection level (HPL) and the vertical protection level (VPL) are obtained. The unmanned aerial vehicle is monitored by setting a horizontal alert limit (HAL) and a vertical alert limit (VAL).

According to the present disclosure, the processor further executes the following instructions: setting the horizontal alert limit according to the lateral dimension of the unmanned aerial vehicle, setting the vertical alert limit according to the longitudinal dimension of the unmanned aerial vehicle, comparing the horizontal protection level of integrated navigation obtained by calculation with the horizontal alert limit, and comparing the vertical protection level of integrated navigation obtained by calculation with the vertical alert limit, and monitoring the unmanned aerial vehicle.

In one embodiment, the flight path planning of the unmanned aerial vehicle is performed by setting the horizontal alert limit (HAL) and the vertical alert limit (VAL).

Figure 4:
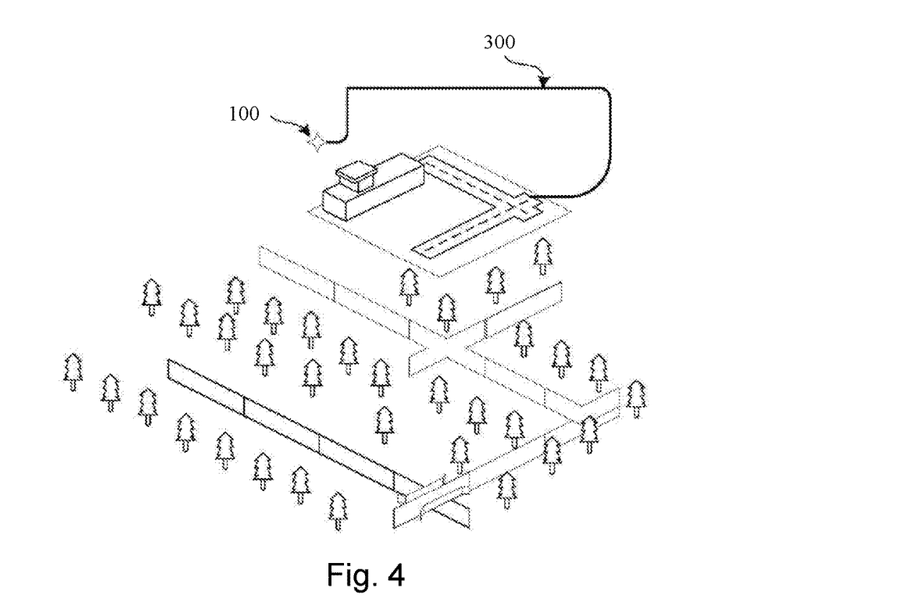
FIG. 4 illustrates a schematic diagram of navigation path planning of the unmanned aerial vehicle according to an embodiment of the present disclosure.

As shown in FIG. 4 illustrating a schematic diagram of navigation path planning of the unmanned aerial vehicle according to an embodiment of the present disclosure, the dimension 1.1 to 1.3 times larger than the lateral dimension of the unmanned aerial vehicle is set as a first horizontal alert limit, and the dimension 1.1 to 1.3 times larger than the longitudinal dimension of the unmanned aerial vehicle is set as a first vertical alert limit, so that a space cube enclosed by the first horizontal alert limit and the first vertical alert limit is shrunken to a flight path 300 of the unmanned aerial vehicle 100.

The horizontal protection level of the integrated navigation obtained by calculation is compared with the first horizontal alert limit, and the vertical protection level of the integrated navigation is compared with the first vertical alert limit, when the horizontal protection level is higher than the first horizontal alert limit and/or the vertical protection level is higher than the first vertical alert limit, the horizontal protection level of the integrated navigation and the vertical protection level of the integrated navigation are recalculated, so that the horizontal protection level is lower than the first horizontal alert limit, and the vertical protection level is lower than the first vertical alert limit.

In other embodiments, the airspace control of the unmanned aerial vehicle is performed by setting the horizontal alert limit (HAL) and the vertical alert limit (VAL).

Figure 5:
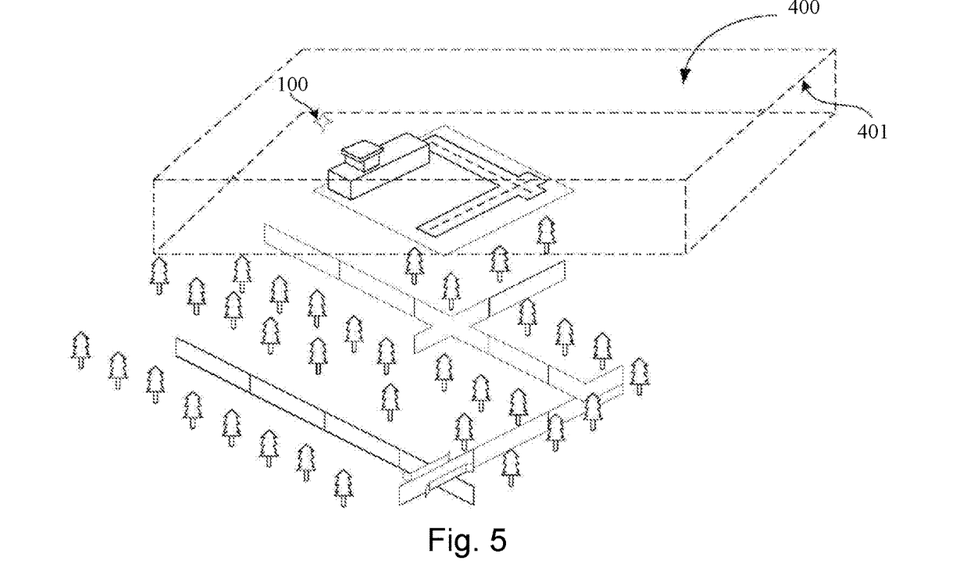
FIG. 5 illustrates a schematic diagram of the boundary of a controlled airspace of the unmanned aerial vehicle according to another embodiment of the present disclosure.

As shown in FIG. 5 illustrating a schematic diagram of the boundary of a controlled airspace of the unmanned aerial vehicle according to another embodiment of the present disclosure, the dimension 100 to 1000 times larger than the lateral dimension of the unmanned aerial vehicle is set as a second horizontal alert limit, and the dimension 100 to 1000 times larger than the longitudinal dimension of the unmanned aerial vehicle is set as a second vertical alert limit, so that a space cube enclosed by the second horizontal alert limit and the second vertical alert limit forms a controlled airspace 400 of the unmanned aerial vehicle 100, and the unmanned aerial vehicle 100 can fly in the boundary 401 of the controlled airspace 400.

The horizontal protection level of the integrated navigation obtained by calculation is compared with the second horizontal alert limit, and the vertical protection level of the integrated navigation is compared with the second vertical alert limit, when the horizontal protection level is higher than the second horizontal alert limit and/or the vertical protection level is higher than the second vertical alert limit, the horizontal protection level of the integrated navigation and the vertical protection level of the integrated navigation are recalculated, so that the horizontal protection level is lower than the second horizontal alert limit, and the vertical protection level is lower than the second vertical alert limit.

According to the integrated navigation integrity monitoring system for the unmanned aerial vehicles provided by the present disclosure, the integrity risk is allocated to the two directions: horizontal and vertical directions, then integrity risks in the horizontal and vertical directions are divided into a nominal hypothesis, an inertial navigation fault hypothesis and a global navigation fault hypothesis, and the horizontal protection and vertical protection levels are calculated respectively, so that the inertial navigation system can be achieved without hardware redundancy, and the cost of integrated navigation integrity monitoring can be reduced.

According to the integrated navigation integrity monitoring system for the unmanned aerial vehicles provided by the present disclosure, the hardware redundancy of the inertial navigation system (INS) is not needed any more, thereby greatly reducing the cost of unmanned aerial vehicle navigation on the one hand, and avoiding interference of redundant information on the other hand.

According to the integrated navigation integrity monitoring system for the unmanned aerial vehicles provided by the present disclosure, the risk is allocated to a horizontal domain and a vertical domain through the allocation of integrity risk, and then the fault hypothesis in the horizontal domain and the vertical domain are divided into three parts: a nominal hypothesis, a global navigation system fault hypothesis and an inertial navigation fault hypothesis, thereby achieving the integrity of the system from the system level and also achieving the integrity of each branch from the hardware level.

According to the integrated navigation integrity monitoring system for the unmanned aerial vehicles provided by the present disclosure, for the inertial navigation fault hypothesis, in addition to setting the size of the error weight ratio, the situations of the horizontal direction and the vertical direction are separated by using different missed detection coefficient calculation methods, thereby more accurately describing the error deviation situations in the horizontal and vertical directions in the navigation; meanwhile, the influence of the filter gain and process noise error of the extended Kalman filter state equation (EKF) of the integrated navigation is considered to reflect the influence of the algorithm and the actual running noise on the calculation of protection levels.

According to the integrated navigation integrity monitoring system for the unmanned aerial vehicles provided by the present disclosure, for the global navigation system fault hypothesis, the calculation methods of corresponding missed detection coefficients are adjusted by a difference in distinguishabilities of error deviations in the horizontal direction and the vertical direction caused by the satellite fault, so that the algorithms corresponding to the horizontal protection level and the vertical protection level better adapt to the actual error deviation situation.

According to the integrated navigation integrity monitoring system for the unmanned aerial vehicles provided by the present disclosure, the planning and tracking of the unmanned aerial vehicle navigation path can be realized only by limiting the horizontal alert limit and the vertical alert limit according to the requirements of the actual application. And according to the determined specific flight airspace boundary, the corresponding horizontal alert limit and vertical alert limit can be set, so that the safe flight of the unmanned aerial vehicle in the controlled airspace can be realized, and the practical application such as corresponding airspace flight prohibition can be derived.

Other embodiments of the invention will be apparent to those skilled in the prior art in conjunction with the description and practice of the present disclosure disclosed herein. The description and the embodiments are to be considered as illustrative only, and the true scope and spirit of the present disclosure are defined by the claims.

What is claimed is:

1. An integrated navigation integrity monitoring system for unmanned aerial vehicles, characterized in that the system comprises:

an inertial measurement unit configured to provide a processor with zero offset values;

a receiver configured to receive signals from global satellite navigation satellites and to provide the processor with an integrity risk of a global satellite navigation system; and the processor configured to calculate a horizontal protection level of integrated navigation and a vertical protection level of integrated navigation, wherein the horizontal protection level of the integrated navigation is calculated by the following method:

$HPL=\max\{HPL_{GNSS,fault}, HPL_{IMU,fault}, HPL_{IMU,Nominal}\}$,
wherein $HPL_{GNSS,fault}$ is a horizontal protection level under a global satellite navigation system fault hypothesis, $HPL_{IMU,fault}$ is a horizontal protection level under a inertial navigation fault hypothesis, and $HPL_{IMU,Nominal}$ is a horizontal protection level under an inertial navigation nominal hypothesis;

the vertical protection level of the integrated navigation is calculated by the following method:

$VPL=\max\{VPL_{GNSS,fault}, VPL_{IMU,fault}, VPL_{IMU,Nominal}\}$,
wherein $VPL_{GNSS,fault}$ is a vertical protection level under the global satellite navigation system fault hypothesis, $VPL_{IMU,fault}$ is a vertical protection level under the inertial navigation fault hypothesis, and $VPL_{IMU,Nominal}$ is a vertical protection level under the inertial navigation nominal hypothesis;

the processor further configured to execute the following instructions: setting a horizontal alert limit according to a lateral dimension of the unmanned aerial vehicle, setting a vertical alert limit according to a longitudinal dimension of the unmanned aerial vehicle, comparing the horizontal protection level of the integrated navigation obtained by calculation with the horizontal alert limit, and comparing the vertical protection level of the integrated navigation obtained by calculation with the vertical alert limit, and monitoring the unmanned aerial vehicle.

2. The system according to claim 1, characterized in that the horizontal protection level under the inertial navigation nominal hypothesis $HPL_{IMU,Nominal}$ is calculated by the following method:

$$HPL_{IMU,Nominal}=K_{md,INS,H}\sigma_{IMU,std,h},$$

wherein $\sigma_{IMU,std,h}$ is a standard deviation of performance parameters of the inertial measurement unit in the horizontal direction, and $K_{md,INS,H}$ is a missed detection coefficient in the horizontal direction under the inertial navigation nominal hypothesis;

the missed detection coefficient in the horizontal direction under the inertial navigation nominal hypothesis $K_{md,INS,H}$ is obtained by the following method:

$$K_{md,INS,H} = Q^{-1}(\lambda_{IMU,std,h} P_{HMI,H,Nominal}),$$

wherein, Q is a cumulative distribution function of zero-mean Gaussian distribution, $\lambda_{IMU,std,h}$ is an error weight ratio of an integrity risk in the horizontal direction under the inertial navigation nominal hypothesis, and satisfies $0 < \lambda_{IMU,std,h} < 1$, and $P_{HMI,H,Nominal}$ is the integrity risk allocated in the horizontal direction under the inertial navigation nominal hypothesis;

the standard deviation of the performance parameters of the inertial measurement unit in the horizontal direction $\sigma_{IMU,std,h}$ is obtained by the following method:

$$\sigma_{IMU,std,h} = \sqrt{(\sigma_{IMU,std,N})^2 + (\sigma_{IMU,std,E})^2},$$

wherein $\sigma_{IMU,std,N}$ is a northward standard deviation under the north east up coordinate system, and $\sigma_{IMU,std,E}$ is an eastward standard deviation under the north east up coordinate system.

3. The system according to claim 1, characterized in that the horizontal protection level under the inertial navigation fault hypothesis $HPL_{IMU,fault}$ is calculated by the following method:

$$HPL_{IMU,fault} = K_{md,INS-fault,H} \sigma_{IMU,fault,h} + \frac{1}{N}\sum_{i=1}^{N}(K_{k,i} + \Gamma_{\omega,i}\vec{\omega}_{k,i}),$$

wherein $\sigma_{IMU,fault,h}$ is a fault deviation in the horizontal direction under the inertial navigation fault hypothesis, $K_{md,INS-fault,H}$ is a missed detection coefficient in the horizontal detection under the inertial navigation fault hypothesis, $K_{k,i}$ is Kalman filter gain at the current sampling instant i, $\Gamma_{\omega,i}\vec{\omega}_{k,i}$ is a process noise deviation correction quantity at the current sampling instant i, $\Gamma_{\omega,i}$ is a noise covariance matrix input at the current instant i, $\vec{\omega}_{k,i}$ is a process noise vector at the current time i, and k is the state of an extended Kalman filter equation in the integrated navigation, N=1, 2, . . . ;

the missed detection coefficient in the horizontal direction under the inertial navigation fault hypothesis $K_{md,INS-fault,H}$ is obtained by the following method:

$$K_{md,INS-fault,H} = Q^{-1}(\lambda_{IMU,fault,h} P_{HMI,H,INS}),$$

wherein Q is a cumulative distribution function of zero-mean Gaussian distribution, $\lambda_{IMU,fault,h}$ is an error weight ratio of an integrity risk in the horizontal direction under the inertial navigation fault hypothesis, and satisfies $0 < \lambda_{IMU,fault,h} < 1$, and $P_{HMI,H,INS}$ is the integrity risk allocated in the horizontal direction under the inertial navigation fault hypothesis;

the fault deviation in the horizontal direction under the inertial navigation fault hypothesis $\sigma_{IMU,fault,h}$ is obtained by the following method:

$$\sigma_{IMU,fault,h} = \sqrt{(\sigma_{IMU,fault,N})^2 + (\sigma_{IMU,fault,E})^2},$$

wherein $\sigma_{IMU,fault,N}$ is a northward fault deviation under the north east up coordinate system, and $\sigma_{IMU,fault,E}$ is an eastward fault deviation under the north east up coordinate system.

4. The system according to claim 1, characterized in that the horizontal protection level under the global satellite navigation system fault hypothesis $HPL_{GNSS,fault}$ is calculated by the following method:

$$HPL_{GNSS,fault} = \mu_{max,h} + K_{ffmd,H} \sigma_{x_k,h},$$

wherein $$\mu_{max,h} = \frac{1}{N}\sum_{i=1}^{N} \mu_{k,h,i}$$

is an arithmetic mean correction quantity of a component $\mu_{k,h,i}$ of an mean position deviation $\mu_{k,i}$ in the horizontal direction, $K_{ffmd,H}$ is a missed detection coefficient in the horizontal detection under the global navigation system fault hypothesis, and $\sigma_{x_k,h}$ is a fault deviation in the horizontal detection under the global navigation system fault hypothesis, the missed detection coefficient in the horizontal detection under the global navigation system fault hypothesis $K_{ffmd,H}$ is obtained by the following method:

$$K_{ffmd,H} = Q^{-1}(P_{HMI,H,GNSS}/2),$$

wherein Q is a cumulative distribution function of zero-mean Gaussian distribution, and $P_{HMI,H,GNSS}$ is an integrity risk allocated in the horizontal direction under the global navigation system fault hypothesis.

5. The system according to claim 1, characterized in that the vertical protection level under the inertial navigation nominal hypothesis $VPL_{IMU,Nominal}$ is calculated by the following method:

$$VPL_{IMU,Nominal} = K_{md,INS,V} \sigma_{IMU,std,v},$$

wherein $\sigma_{IMU,std,v}$ is a standard deviation of performance parameters of the inertial measurement unit in the vertical direction, and $K_{md,INS,V}$ is a missed detection coefficient in the vertical detection under the inertial navigation nominal hypothesis;

the missed detection coefficient in the vertical detection under the inertial navigation nominal hypothesis $K_{md,INS,V}$ is obtained by the following method:

$$K_{md,INS,V} = Q^{-1}(1-\lambda_{IMU,std,v} P_{HMI,V,Nominal}),$$

wherein Q is a cumulative distribution function of zero-mean Gaussian distribution, $\lambda_{IMU,std,v}$ is an error weight ratio of an integrity risk in the vertical direction under the inertial navigation nominal hypothesis, and satisfies $0 < \lambda_{IMU,std,v} < 1$, and $P_{HMI,V,Nominal}$ is the integrity risk allocated in the vertical direction under the inertial navigation nominal hypothesis;

the standard deviation of the performance parameters of the inertial measurement unit in the vertical direction $\sigma_{IMU,std,v}$ is obtained by the following method:

$$\sigma_{IMU,std,v} = \sigma_{IMU,std,U},$$

wherein $\sigma_{IMU,std,v}$ is an upward standard deviation under the north east up coordinate system.

6. The system according to claim 1, characterized in that the vertical protection level under the inertial navigation fault hypothesis $VPL_{IMU,fault}$ is calculated by the following method:

$$VPL_{IMU,fault} = K_{md,INS-fault,V} \sigma_{IMU,fault,v} + \frac{1}{N}\sum_{1}^{N}(K_{k,i} + \Gamma_{\omega,i}\vec{\omega}_{k,i}),$$

wherein $\sigma_{IMU,fault,v}$ is a fault deviation in the vertical direction under the inertial navigation fault hypothesis, $K_{md,INS-fault,V}$ is a missed detection coefficient in the vertical detection under the inertial navigation fault hypothesis, $K_{k,i}$ is Kalman filter gain at the current sampling instant i, $\Gamma_{\omega,i}\vec{\omega}_{k,i}$ is a process noise deviation correction quantity at the current sampling instant i, $\Gamma_{\omega,i}$ is a noise covariance matrix input at the current instant i, $\vec{\omega}_{k,i}$ is a process noise vector at the current instant i, and k is the state of an extended Kalman filter equation in the integrated navigation, N=1, 2, . . . ;

the missed detection coefficient in the vertical detection under the inertial navigation fault hypothesis $K_{md,INS-fault,V}$ is obtained by the following method:

$K_{md,INS-fault,V} = Q^{-1}(1 - \lambda_{IMU,fault,v} P_{HMI,V,INS})$, wherein Q is a cumulative distribution function of zero-mean Gaussian distribution, $\lambda_{IMU,fault,v}$ is an error weight ratio of an integrity risk in the vertical direction under the inertial navigation fault hypothesis, and satisfies $0 < \lambda_{IMU,fault,v} < 1$, and $P_{HMI,V,INS}$ is the integrity risk allocated in the vertical direction under the inertial navigation fault hypothesis;

the fault deviation in the vertical direction under the inertial navigation fault hypothesis $\sigma_{IMU,fault,v}$ is obtained by the following method:

$\sigma_{IMU,fault,v} = \sigma_{IMU,fault,U}$, wherein $\sigma_{IMU,fault,U}$ is an upward fault deviation under the north east up coordinate system.

7. The system according to claim 1, characterized in that the vertical protection level under the global satellite navigation system fault hypothesis $VPL_{GNSS,fault}$ is calculated by the following method:

$VPL_{GNSS,fault} = \mu_{max,v} + K_{ffmd,V}\sigma_{x_k,v}$, wherein $$\mu_{max,v} = \frac{1}{N}\sum_{i=1}^{N}\mu_{k,v,i}$$

is an arithmetic mean correction quantity of a component $\mu_{k,v,i}$ of a mean position deviation $\mu_{k,i}$ in the vertical direction, $K_{ffmd,V}$ is a missed detection coefficient in the vertical detection under the global navigation system fault hypothesis, and $\sigma_{x_k,v}$ is a fault deviation in the vertical direction under the global navigation system fault hypothesis;

the missed detection coefficient in the horizontal detection under the global navigation system fault hypothesis $K_{ffmd,V}$ is obtained by the following method:

$K_{ffmd,V} = Q^{-1}(1 - P_{HMI,V,GNSS}/2)$, wherein Q is a cumulative distribution function of zero-mean Gaussian distribution, and $P_{HMI,V,GNSS}$ is an integrity risk allocated in the vertical direction under the global navigation system fault hypothesis.

8. The system according to claim 1, characterized in that a dimension 1.1 to 1.3 times larger than the lateral dimension of the unmanned aerial vehicle is set as a first horizontal alert limit, and the dimension 1.1 to 1.3 times larger than the longitudinal dimension of the unmanned aerial vehicle is set as a first vertical alert limit, so that a space cube enclosed by the first horizontal alert limit and the first vertical alert limit is shrunken onto a flight path of the unmanned aerial vehicle, the horizontal protection level of the integrated navigation obtained by calculation is compared with the first horizontal alert limit, and the vertical protection level of the integrated navigation is compared with the first vertical alert limit, when the horizontal protection level is higher than the first horizontal alert limit and/or the vertical protection level is higher than the first vertical alert limit, the horizontal protection level of the integrated navigation and the vertical protection level of the integrated navigation are recalculated, so that the horizontal protection level is lower than the first horizontal alert limit, and the vertical protection level is lower than the first vertical alert limit.

9. The system according to claim 1, characterized in that a dimension 100 to 1000 times larger than the lateral dimension of the unmanned aerial vehicle is set as a second horizontal alert limit, and the dimension 100 to 1000 times larger than the longitudinal dimension of the unmanned aerial vehicle is set as a second vertical alert limit, so that a space cube enclosed by the second horizontal alert limit and the second vertical alert limit forms a flight space of the unmanned aerial vehicle, the horizontal protection level of the integrated navigation obtained by calculation is compared with the second horizontal alert limit, and the vertical protection level of the integrated navigation is compared with the second vertical alert limit, when the horizontal protection level is higher than the second horizontal alert limit and/or the vertical protection level is higher than the second vertical alert limit, the horizontal protection level of the integrated navigation and the vertical protection level of the integrated navigation are recalculated, so that the horizontal protection level is lower than the second horizontal alert limit, and the vertical protection level is lower than the second vertical alert limit.

\* \* \* \* \*